United States Patent [19]
Camlin

[11] Patent Number: 5,816,357
[45] Date of Patent: Oct. 6, 1998

[54] REAR WHEEL SUSPENSION DEVICE FOR MOTORCYCLES

[75] Inventor: Donald Camlin, Rock Island, Ill.

[73] Assignee: Slick Suspension, Inc., Rock Island, Ill.

[21] Appl. No.: 761,222

[22] Filed: Dec. 6, 1996

[51] Int. Cl.⁶ .................................................. B62K 25/26
[52] U.S. Cl. .......................... 180/227; 280/275; 280/284
[58] Field of Search .................................. 180/227, 284, 180/285, 275, 286, 688

[56] References Cited

U.S. PATENT DOCUMENTS

| | | | |
|---|---|---|---|
| 2,604,336 | 7/1952 | Seddon et al. | 180/227 |
| 4,515,236 | 5/1985 | Kanamori | 180/227 |
| 4,556,119 | 12/1985 | Shiratsuchi | 180/227 |
| 4,596,302 | 6/1986 | Suzuki et al. | 180/227 |
| 4,653,604 | 3/1987 | De Cortanze | 180/227 |
| 4,724,920 | 2/1988 | Tsuchida et al. | 180/227 |
| 4,805,717 | 2/1989 | Trema | 180/219 |
| 4,830,391 | 5/1989 | Silk | 180/227 |

FOREIGN PATENT DOCUMENTS

| | | | |
|---|---|---|---|
| 5-178261 | 7/1993 | Japan | 180/227 |
| 6-183386 | 7/1994 | Japan | 180/227 |

*Primary Examiner*—Brian L. Johnson
*Assistant Examiner*—Gary Savitt

*Attorney, Agent, or Firm*—Basil E. Demeur; Alan B. Samlan; Robert L. Knechtel

[57] ABSTRACT

An improved rear wheel suspension device for motorcycles is provided. A rectangular open-ended tracking assembly is mounted to the lower aspect of a motorcycle frame or motorcycle engine. The side walls of the tracking assembly have elongated slots. A shock absorber shaft is passed through the open end of the tracking assembly, and two elongated pull rods having bolt eyes at their opposite ends are placed against the exterior of the tracking assembly side walls. The pull rods and shock absorber shaft are movably fixed to the tracking assembly by placing a bolt through the tracking assembly slots. The opposite end of the shock absorber is mounted to a downwardly reflecting bracket fixed to the bottom of the motorcycle frame at predetermined distance from the tracking assembly. The opposite ends of both pull rods are then mounted to the downwardly reflecting vertical portion of an essentially "T"-shaped swing arm. One end of the horizontal portion of the swing arm is pivotally mounted to a motorcycle frame and the opposite end of the horizontal portion of the swing arm is rotatably fixed to the axle of the rear wheel. Vertical movement of the rear wheel causes the swing arm to pivot about its motorcycle-frame axis. This in turn causes movement of the pull rods along the length of the tracking assembly slots, thereby causing compression and relaxation of the shock absorber. The device further allows for independent ride height adjustments and spring pre-load adjustments.

14 Claims, 3 Drawing Sheets

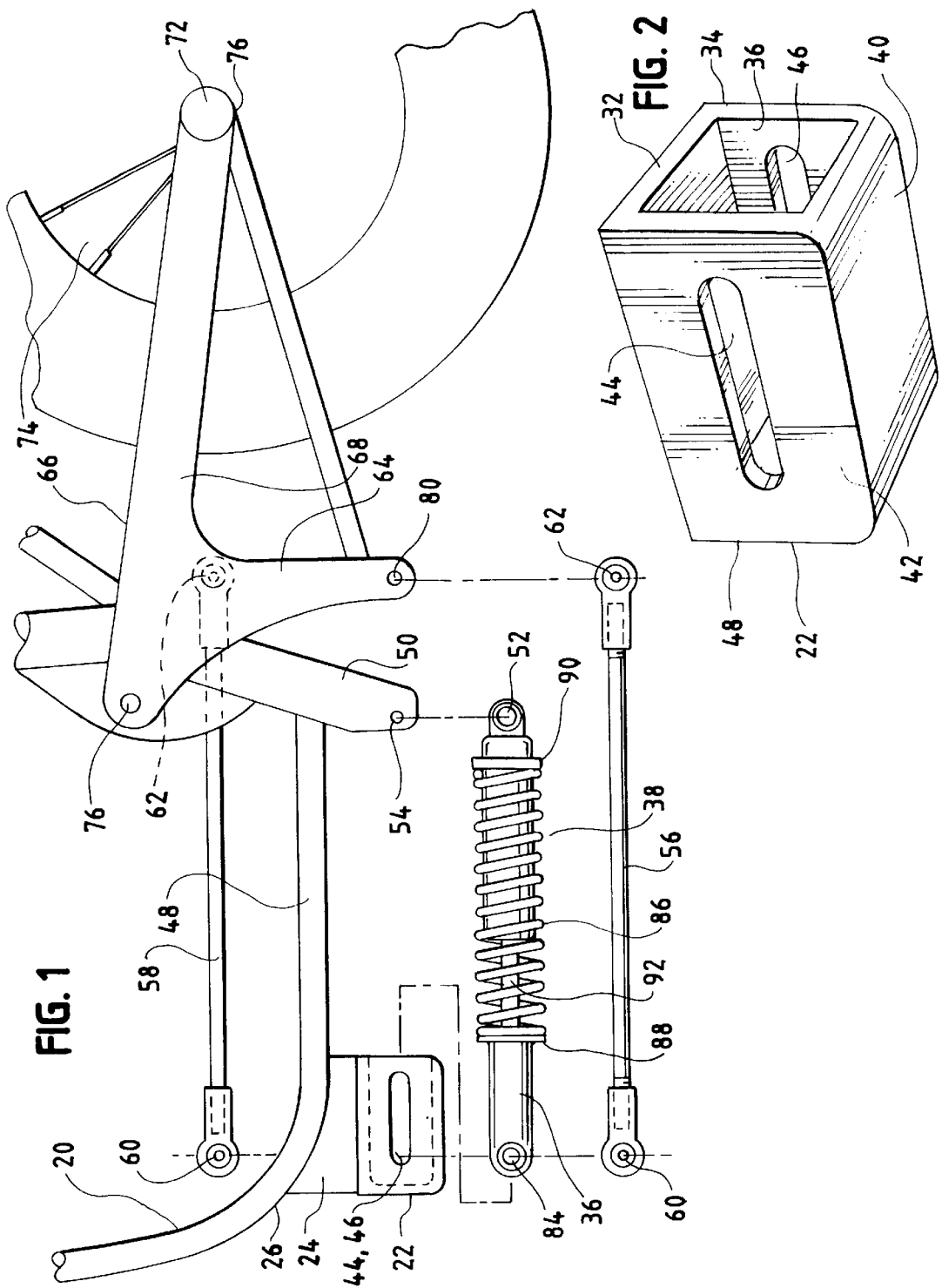

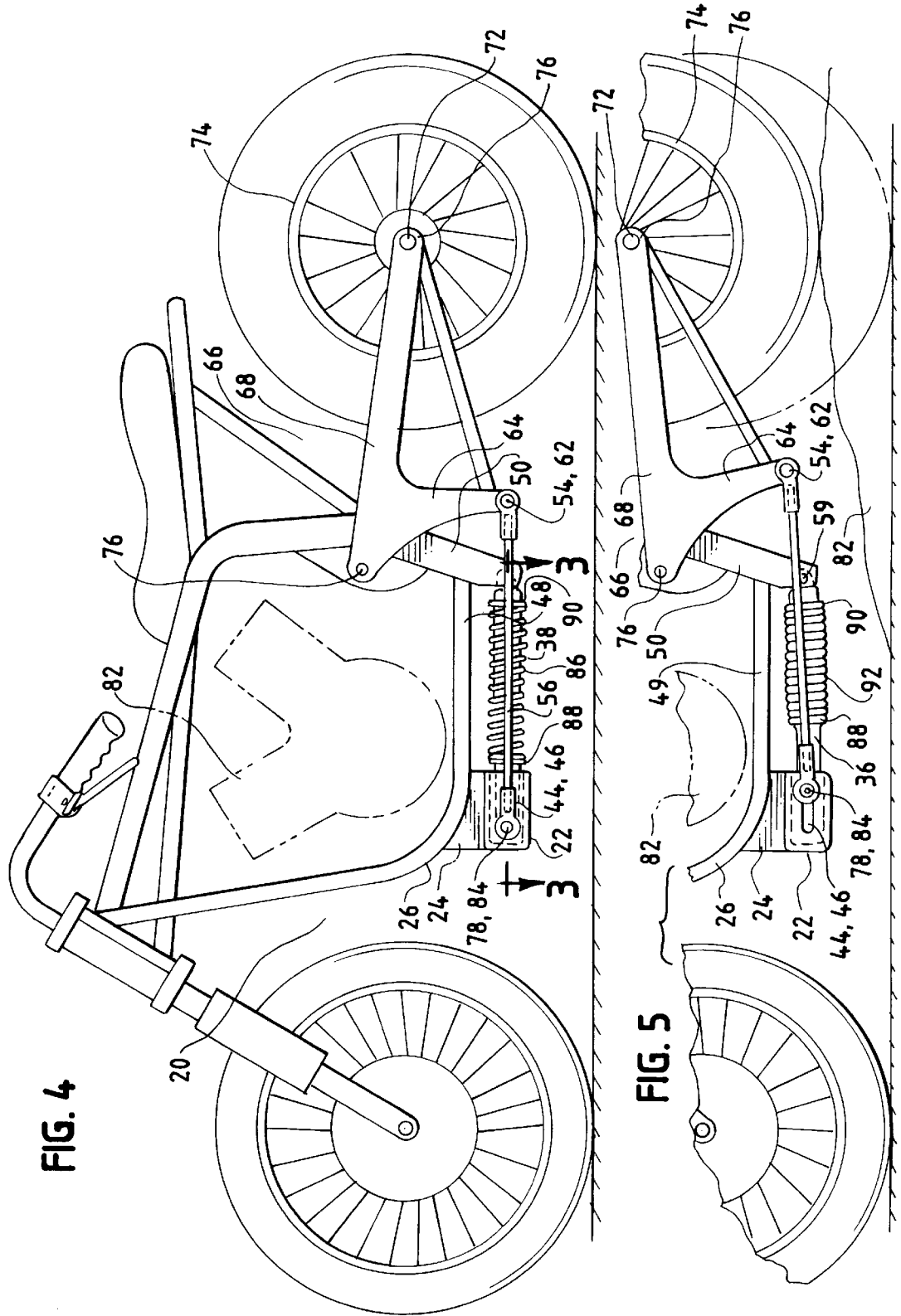

REAR WHEEL SUSPENSION DEVICE FOR MOTORCYCLES

TECHNICAL FIELD

This invention relates to a rear wheel suspension device for motorcycles and, more particularly, to a suspension device having a single shock absorber horizontally mounted to the bottom of the motorcycle frame or engine.

BACKGROUND OF THE INVENTION

Conventional motorcycle rear wheel suspension systems consist of two shock absorbers, one shock absorber mounted on each side of the rear wheel. The shock absorbers are fixed at their upper ends to the motorcycle frame. The lower ends of the shock absorbers are fixed to a swing arm. The swing arm is typically a horizontal bar pivotally affixed at one end to the motorcycle frame and at its opposite end to the rear wheel axle.

Conventional suspension systems have worked well in the past. However, as motorcycles have become lighter and faster, the demands placed upon the suspension components have outstripped present technology. The principal problem is that as the swing arm pivots about the motorcycle-frame axis, the shock absorber moves in an arc. This movement causes pivotal and rotational forces on the shock shaft resulting in shock shaft flexion and binding. This can lead to shock shaft bending and breaking, and seal damage.

Attempts at correcting these problems using conventional suspension methods have focused on increasing the shock shaft and body size, and limiting the amount of shock shaft travel. However, increasing shock shaft and body size increases the weight and mass of the motorcycle. Limiting shock shaft travel requires a complicated, and therefore more expensive, shock. Further, limiting shock shaft travel decreases the hydraulic control of the shock.

PRIOR ART

Horizontally mounting the rear wheel suspension system to the lower aspect of the frame, motor, or other component and connecting the opposite end of the shock to a rear wheel support mechanism is seen in the prior art. An example is found in U.S. Pat. No. 4,724,920 to Tsuchida, et al. which discloses and claims a rear suspension system designed to minimize the height of a motorcycle.

A further example is found in U.S. Pat. No. 4,653,604 to de Cortanze which discloses and claims a horizontally mounted rear wheel suspension system for motorcycles utilizing series of pulleys and leavers which are attached mid shock shaft and to the rear wheel support means.

A final example is found in Great Britain Patent Number 2,142,591A in which another example of a horizontally mounted suspension system is disclosed and claimed. In this device, the shock body is attached to the engine via two v-shaped brackets which are mounted mid shock. The rod end of the shock is directly mounted to the rear wheel support member.

While these devices address certain problems, they all require the shock shaft to move in an arc. Therefore, the problem of pivotal and rotational forces on the shock shaft have not been addressed.

A further shortcoming of the prior art is that in order to combat a side thrust and rotational bind, which result in bent shafts and leaking seals, a heavy duty shock is required.

A further shortcoming is that the prior arts all require several linkages between the shock and the rear wheel support member. These arrangements increase the likelihood of a malfunction, which in turn increases the maintenance costs of the motor cycle.

A further shortcoming of the prior art is that complex shock assemblies having two seals, one at each end of the shock body as opposed to one seal as found on conventional shocks, are required. This too increases the cost of a motorcycle.

Another shortcoming of the prior art is that if ride height adjustments are made, spring pre-load is affected. Conversely, if spring pre-load is adjusted, the ride height is affected.

Therefore, there is need for a horizontally mounted rear wheel suspension device for motorcycles utilizing a conventional, lightweight shock having minimal linkages, and which minimizes the pivotal and rotational forces that lead to shock shaft damage. There is further need for a rear wheel suspension device which permits independent ride height and spring pre-load adjustments.

OBJECTS OF THE PRESENT INVENTION

An object of the present invention is to provide a horizontally mounted rear wheel suspension device for motorcycles which minimizes pivotal and rotational forces on the shock shaft.

Another object of the present invention is to provide a rear wheel suspension device for motorcycles which utilizes a conventional motorcycle shock absorber having a single seal.

Yet another object of the present invention is to provide such a suspension device containing a tracking assembly to minimize pivotal and rotational forces.

A further object of the present invention is to provide a horizontally mounted rear wheel suspension device for motorcycles having minimal linkages between the shock absorber, frame or engine, and the swing arm.

A further object of the present invention is to provide a horizontally mounted rear wheel suspension device for motorcycles in which ride height adjustments do not affect spring pre-load and, conversely, pre-load spring adjustments do not affect ride height.

A further object of the present invention is to provide a horizontally mounted rear wheel suspension device for motorcycles in which the center of gravity of the motorcycle is lower than in comparison to conventional suspension systems.

Further objects and advantages of the present invention will be readily apparent by those skilled in the arts upon reading of the appended specification and claims.

SUMMARY OF THE INVENTION

An improved rear wheel suspension device for motorcycles is provided. According to the invention, an open-ended box shaped tracking assembly is mounted to the lower aspect of a motorcycle frame or motorcycle engine. The side walls of the tracking assembly have elongated slots. The bolt eye of the shock absorber shaft is passed through the open end of the tracking assembly. One end of two elongated pull rods having bolt eyes at their opposite ends is placed on opposite sides of the exterior of the tracking assembly side walls. A shoulder bolt is passed through the pull rods bolt eyes, the tracking assembly side wall slots, and the shock absorber shaft bolt eye. The opposite end of the shock absorber is mounted to a downwardly reflecting bracket fixed to the bottom of the motorcycle frame at a predetermined distance from the tracking assembly.

The free ends of both pull rods are mounted to a downwardly reflecting vertical portion of an essentially "T"-shaped swing arm. One end of the horizontal portion of the swing arm is pivotally mounted to the motorcycle frame and the opposite end of the horizontal portion of the swing arm is rotatably fixed to the axle of the rear wheel.

As an operating motorcycle encounters terrain variations, the rear wheel moves in a vertical direction, thereby causing the swing arm to pivot about its motorcycle-frame axis. This movement causes tension on the pull rods moving them along the length of the track assembly slots. This, in turn, causes compression and relaxation of the shock absorber.

The device also provides for ride height adjustments through adjustment of the pull rod length without affecting shock absorber spring pre-load. Conversely, shock absorber pre-load adjustments do not affect ride height.

BRIEF DESCRIPTION OF THE DRAWINGS

FIG. 1 is an exploded view of the inventive device.

FIG. 2 is an oblique view of the tracking assembly.

FIG. 4 is a side view of a motorcycle depicting the inventive device.

FIG. 5 is a cutaway side view of a motorcycle depicting the inventive device as the rear wheel moves over an obstacle.

DESCRIPTION OF THE PREFERRED EMBODIMENT

Figure 3:
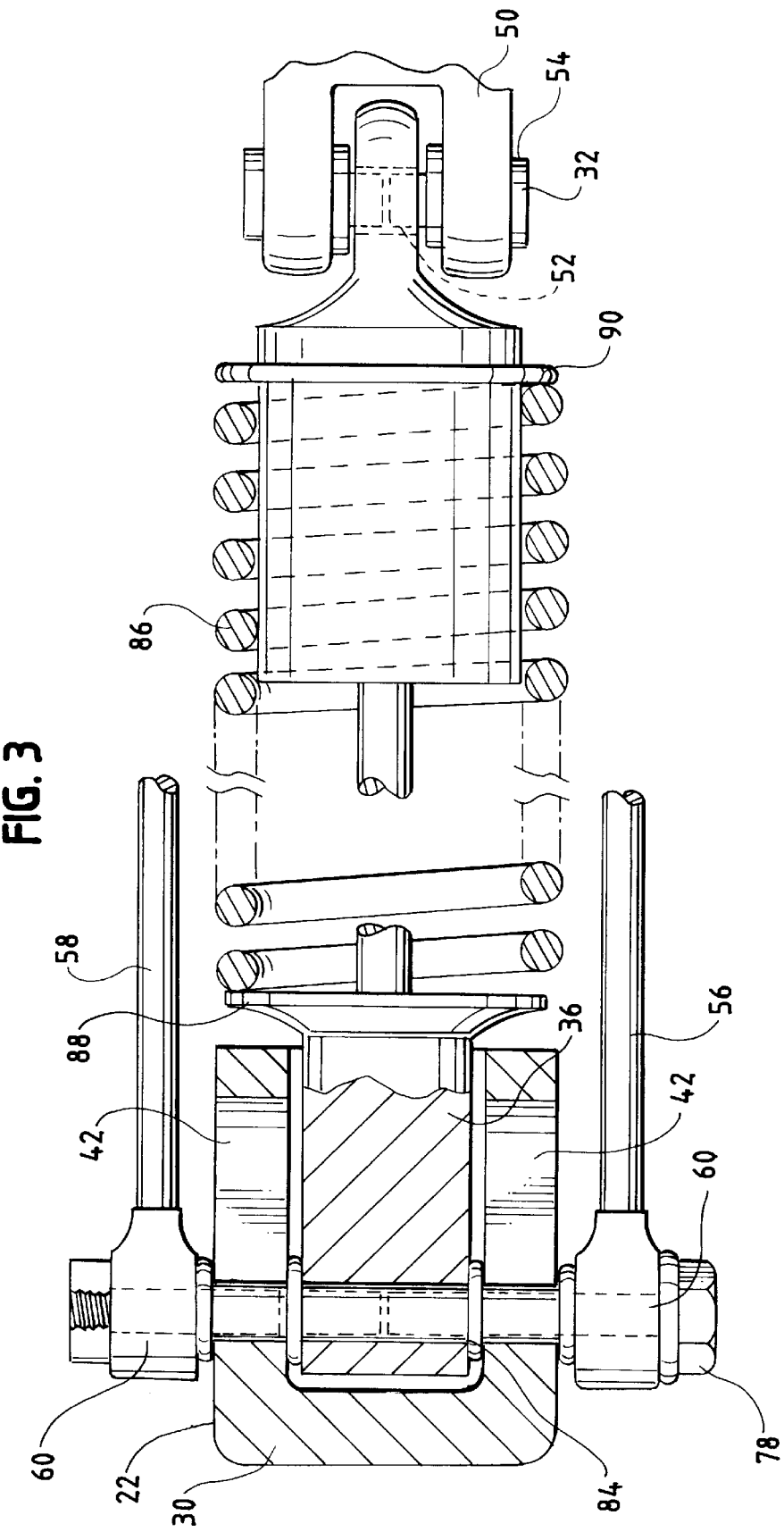
FIG. 3 is a cutaway top view of the inventive device depicting the internal and external mechanical features of the device.

In FIG. 1, the lower aspect of frame 20 is shown. Tracking assembly 22 is affixed to Frame 20 near frame front angle 26 by means of mounting bracket 24. Mounting bracket 24 is preferably welded to tracking assembly 22 and then bolted to frame 20. Alternatively, tracking assembly 22 or mounting bracket 24 can be welded directly to frame 20. However, by bolting mounting bracket 24 to frame 20, adjustments are easier to make; although if mounting bracket 24 is not sufficiently tightened, it can work loose. In an alternate embodiment tracking assembly 22 can be mounted to the lower aspect of the motorcycle engine 82 (FIG. 4). In FIG. 2 it is seen that tracking assembly 22 has a top mounting surface 32 for affixing to mounting bracket 24 or directly to frame 20 or engine 82 (FIG. 4). Tracking assembly 22 also has a rear portion 34 which has an opening 36. Opening 36 faces the back end of the motorcycle and accepts the shock shaft 36 of shock absorber 38. While FIG. 2 depicts opening 36 as encompassing the entire rear portion 34, it can also be made smaller so that only shock shaft 36 will fit through opening 36. Tracking assembly 22 also has a bottom 40 and two side walls 42 found along the outer edge of the mounting surface 32 and bottom 40. One elongated slot 44, 46 is found in each side wall. The elongated slots 44, 46 are essential to the function of the inventive device and will be discussed more thoroughly below. Finally, tracking assembly 22 has a front 48 which is preferably open for easier access to the inner tracking assembly space. Alternatively, a plate 30 (FIG. 3) may be placed over front 43 to close off the tracking assembly 22.

Returning to FIG. 1, toward the rear of frame 20 along its lower bar 40 is found second mounting bracket 50. Second mounting bracket 50 consists of two identical pieces of metal preferably welded to frame 20 at a predetermined distance from tracking assembly 22. Alternatively, they may be attached to the engine (not shown). The distance from the tracking assembly is dependent on the type of motorcycle, frame 20, shock absorber 38 type, and use of the motorcycle. The second mounting brackets 50 are affixed to the frame 20 at a distance apart from one another so that shock absorber body eye 52 can fit between them. Each second mounting bracket 50 has a hole 54 for attaching shock body eye 52 with a bolt 32 (FIG. 3).

Pull rods 56, 58 have attachment means 60, 62 at each end. First attachment means 60, and second attachment means 62 are threaded onto the pull rods 56, 58 so that adjustment to their length can be made. The pull rods 56, 58 mount to the exterior surface of tracking assembly 22 by means of a bolt 78 (FIG. 3) which passes through first attachment means 60, and elongated slot 44, 46. Second attachment means 62 pivotally affixes to the vertical portion 64 of swing arms 66 at second pivot point 80.

There are two swing arms 66, one on each side of frame 20. Swing arms 66 are essentially "T"-shaped, each having a horizontal portion 68 and a vertical portion 64. Horizontal portion 68 affixes to frame 20 at first pivot point 70 and to the axle 72 of rear wheel 74 at attachment point 76. To pivotally affix pull rods 56, 58 at second pivot point 80, a bolt 32 (FIG. 3) passes through second attachment means 62 of pull rod 56 and swing arm 66 vertical portion 64. A sleeve (not shown) maintains the distance separation between the swing arms 66.

Turning to FIGS. 4 and 5, operation of the device is illustrated. As a motorcycle encounters terrain variations 82, rear wheel 74 moves vertically. As rear wheel 74 moves in an upward direction, the horizontal portion 68 of swing arm 66 also moves upward by pivoting about first pivot point 76. This movement also raises vertical portion 64, causing pull rods 56, 58 to pivot about second pivot point 80 in an upward and rearward direction at second attachment means 62. This causes tension at pull rod first attachment means 60, causing pull rods 56, 58 to move in a rearward horizontal line through elongated slots 44, 46. This horizontal movement of pull rods 56, 58 in turn causes shock shaft 36 to likewise move in rearward horizontal line through elongated slots 44, 46 since bolt 78 passes through first attachment means 60, elongated slots 44, 46 and shock shaft eye 84. Since shock body eye 52 is fixed in place by second bracket 50, the movement of shock shaft 84 causes fixed circular retainer 88 to compress shock spring 86 against circular retainer 90. As rear wheel 74 travels downward, the movements are reversed.

Locking the shock absorber 38 into a horizontal line of movement maintains shock absorber alignment, thereby preventing flexing and binding of shock shaft 36 and shock rod 92. Further, there is no rotational bind of the shock absorber as rotation is performed by the pivotally mounted pull rods 56, 58. These benefits decrease the likelihood of shock absorber damage. Further benefits are realized in that a lighter duty shock absorber with more shaft travel can be used than is required by other systems. This decreases both the cost and weight of the motorcycle.

Also, by moving the rear wheel suspension system to essentially below the frame, the center of gravity is lowered. By lowering the center of gravity, ride height can be increased. This increases the vertical space the rear wheel can travel and maximizes suspension travel. Ride height adjustment are completed by adjusting pull rod 56, 58 length. An additional benefit is that changes in ride height do not affect spring 86 pre-load. Pre-load, which determines suspension stiffness, can be independently adjusted without affecting ride height. This is not seen in the prior art.

I claim:

1. A rear wheel suspension device in combination with a motorcycle comprising:

a motorcycle frame having a front end, a rear end, a top, a bottom, and two sides;

a rear wheel including an axle;

two pull rods having opposite ends containing attachment means;

two essentially T-shaped swing arms each having a horizontal portion with a mounting means at one of its ends for pivotally mounting to the motorcycle frame and a second mounting means at its opposite end for rotatably mounting to the rear axle and a downwardly extending vertical portion having a third mounting means for pivotally mounting the pull rods;

said horizontal and vertical portions being defined relative to the motorcycle frame in a rest position;

a shock absorber having a shaft end and a body end;

a tracking assembly means affixed to the bottom of the motorcycle frame for movably containing the shock absorber shaft end and one end of the pull rods;

a bracket mounted to the bottom of the frame at a predetermined distance from the tracking assembly means for attachment of the shock absorber body;

whereby vertical movement of the rear wheel assembly causes the swing arms to pivot about a longitudinal motorcycle frame axis, thereby exerting pressure on the pull rods causing compression and relaxation of the shock absorber.

2. The apparatus of claim 1 wherein the tracking assembly means has an open end facing the rear of the motorcycle frame for accepting the shock absorber shaft end and two side walls with elongated slots which enable horizontal movement of the shock absorber shaft end and pull rods.

3. The apparatus of claim 2 wherein the shock absorber shaft end and pull rod attachment means are movably affixed to the tracking assembly means through the elongated slots.

4. The apparatus of claim 1 wherein the length of the pull rod can be adjusted, thereby effecting the ride height.

5. The apparatus of claim 1 wherein the shock absorber has a spring which can be adjusted for pre-load.

6. The apparatus of claim 3 wherein adjustment of pull rod length does not effect shock absorber spring pre-load.

7. The apparatus of claim 5 wherein adjusting spring pre-load does not effect ride height.

8. The motorcycle frame of claim 1 further housing an engine having an upper portion and a lower portion.

9. The apparatus of claim 8 wherein the tracking assembly means is affixed to the lower portion of the engine.

10. The apparatus of claim 1 wherein the shock absorber is of the single seal variety.

11. A ride stiffness and height adjustable rear wheel suspension device in combination with a motorcycle comprising:

a motorcycle including a frame having a front end, rear end, top, bottom, two sides, an engine having an upper portion and a lower portion, a front wheel assembly, and a rear wheel assembly including an axle;

a shock absorbing means having opposite ends, each end having attachment means;

two pull rods having length adjustment means and opposite ends, each end having attachment means;

two essentially T-shaped swing arms each having an essentially horizontal portion with opposite ends, one end affixing to the frame and the other end affixing to the rear wheel assembly axle and an essentially vertical portion which affixes to one end of the pull rods; said essentially horizontal and essentially vertical portions being defined relative to the motorcycle frame in a rest position;

a tracking assembly means mounted to the motorcycle frame or engine and further comprising an open end for accepting one end of the shock absorber means and two side walls having elongated slots for affixing one end of the shock absorbing means and the other end of the pull rods and enabling horizontal movement of the shock absorber means and pull rods;

a bracket affixed to the bottom of the frame at a predetermined distance from the tracking assembly means for attachment of the other end of the shock absorber means;

whereby adjustment of the pull rod length affects ride height but not shock absorber means pre-load and adjustment of shock absorber pre-load affects ride stiffness but not ride height.

12. The apparatus of claim 11 wherein the tracking assembly means is an essentially rectangular box having a top with means for mounting to the frame or engine, a front wall, a bottom, an open end facing the rear of the motorcycle frame for accepting the shock absorber shaft end and two side walls with elongated slots which enable horizontal movement of the shock absorber shaft and pull rods attachment means.

13. The apparatus of claim 12 wherein the shock absorber shaft end and pull rod attachment means are movably affixed to the tracking assembly means through the elongated slots.

14. The apparatus of claim 11 wherein the shock absorber means is of the single seal variety.

* * * * *